United States Patent
Bergmann et al.

(10) Patent No.: US 6,835,263 B2
(45) Date of Patent: Dec. 28, 2004

(54) METHOD OF PRODUCING A TUBE-SHAPED TORSION-PROOF AND BENDING-RESISTANT DRIVE SHAFT

(75) Inventors: Anton Bergmann, Prien (DE); Marinus Sedlmeier, Hausham (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 292 days.

(21) Appl. No.: 10/113,934

(22) Filed: Apr. 2, 2002

(65) Prior Publication Data

US 2002/0160138 A1 Oct. 31, 2002

(30) Foreign Application Priority Data

Apr. 3, 2001 (DE) ......... 101 16 478
Feb. 12, 2002 (DE) ......... 102 05 657

(51) Int. Cl.$^7$ ............................................. B65H 81/00
(52) U.S. Cl. ................. 156/171; 156/173; 156/175; 156/184; 156/188; 156/190; 464/181; 464/183; 464/903
(58) Field of Search ................. 156/169, 171, 156/172, 173, 175, 184, 187, 188, 190, 194, 160, 163, 164; 464/180, 181, 183, 903

(56) References Cited

U.S. PATENT DOCUMENTS

| 3,148,102 A | * | 9/1964 | Eakins et al. ........... 156/173 |
| 3,713,946 A | | 1/1973 | Molyneux |
| 4,089,190 A | * | 5/1978 | Worgan et al. ........... 464/181 |
| 4,171,626 A | * | 10/1979 | Yates et al. ........... 156/173 |
| 4,174,243 A | * | 11/1979 | Magarian ........... 156/175 |
| 5,076,871 A | | 12/1991 | Frye et al. |
| 5,208,051 A | | 5/1993 | Berg et al. |
| 5,474,630 A | | 12/1995 | Rouillot |

FOREIGN PATENT DOCUMENTS

| DE | 1923179 | 9/1965 |
| DE | 3822417 | 6/1990 |

* cited by examiner

*Primary Examiner*—Jeff H Aftergut
(74) *Attorney, Agent, or Firm*—Crowell & Moring LLP

(57) ABSTRACT

An undercritical drive shaft and a method of producing the undercritical drive shaft from fiber composite material is disclosed. The drive shaft, which is produced of fiber composite material and is to be used as an undercritically operating shaft, has a high damage tolerance with respect to resistance to torsion and the manufacturing process requires lower expenditures. For the drive shaft, the fiber composite material consists of several successively individually wound-up webs of prepreg. For the method of producing the drive shaft from fiber composite material, as the fiber material, the web-shaped prepreg is wound onto the winding spindle and this prepreg is deaerated and simultaneously compressed by the winding-on of a thermoplastic woven band which is prestressed in a defined manner. The thermoplastic woven band is unwound again and additional prepreg layers are then wound up which are then deaerated and compressed in the same manner by a thermoplastic woven band.

17 Claims, 2 Drawing Sheets

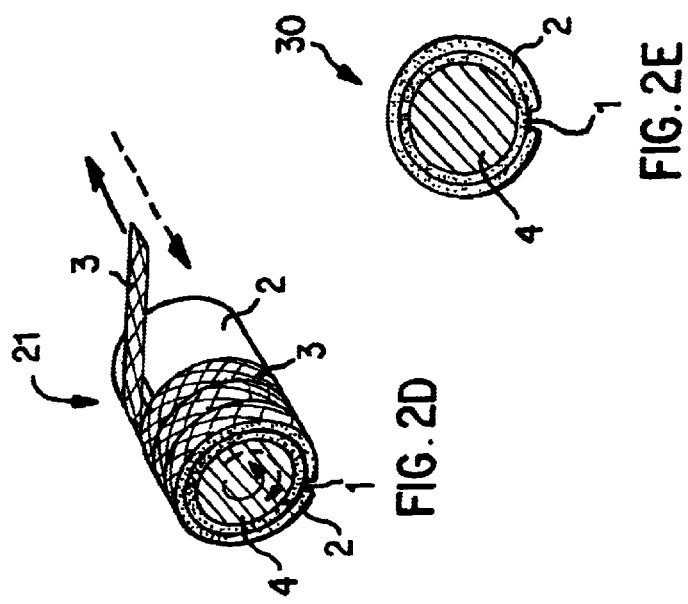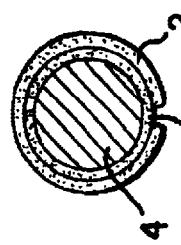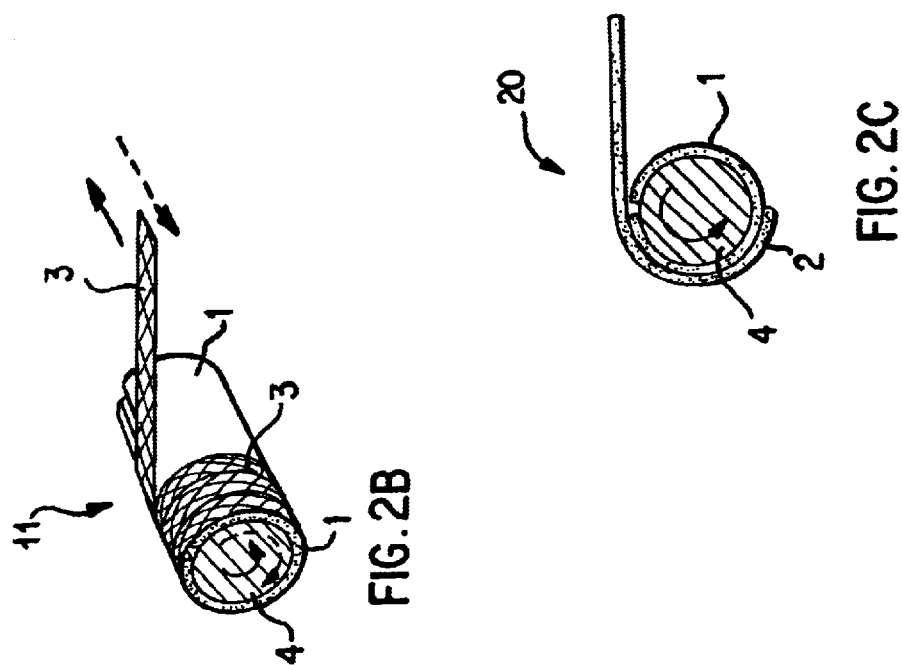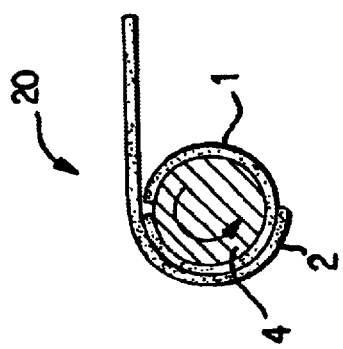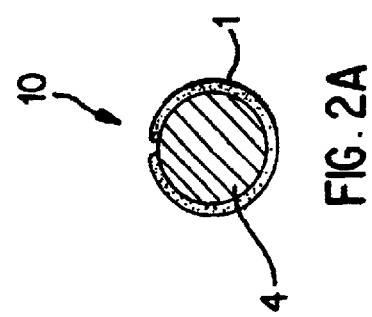

METHOD OF PRODUCING A TUBE-SHAPED TORSION-PROOF AND BENDING-RESISTANT DRIVE SHAFT

BACKGROUND AND SUMMARY OF THE INVENTION

This application claims the priority of German Patent Documents Nos. 101 16 478.5 and 102 05 657.9, filed Apr. 3, 2001 and Feb. 12, 2002, respectively, the disclosures of which are both expressly incorporated by reference herein.

The invention relates to a method of producing a tube-shaped torsion-proof and bending-resistant drive shaft consisting of a fiber composite material which consists at least of several wound-up webs of prepreg, the prepreg webs being wound on a withdrawable winding spindle and the tube-shaped drive shaft wound of layers of prepreg webs being heated and hardened.

Numerous systems and machines have a drive and the torque existing on the output side has to be transmitted by means of a transmission line to the operating device. The operating device may consist of various types, for example, a wheel, a roller, a propeller, a rotor and others. The operating device is not limited to a certain type. A transmission line is considered which has at least one drive shaft. In addition, gears or other force transmission devices can be used. As a rule, the drive shaft is made of a metallic material and its geometry is dimensioned corresponding to the driving task.

In the following, a drive shaft with an unchanged arrangement geometry is considered whose relatively high nominal rotational speed has to ensure a sufficient power transmission but must nevertheless be below a critical rotational speed, and which therefore, in its application, must have a relatively high resistance to bending and torsion and must at the same time be tolerant with respect to damage in regard to the torsional moment.

The demand for tolerance to damage of an undercritical drive shaft is made for reasons of personal or technical safety or because of high investment costs. Tolerance with respect to damage demands that a defined damage to the drive shaft, for example, a mechanical impact onto the drive shaft of an intensity of from 25 to 50 joule, has to be withstood by the drive shaft in a function-maintaining manner (2.5 kg from a height of fall of 1 m corresponds to 25 joule). When damage tolerance stability exists, the hidden or visible damage must not endanger the resistance to torsion of the drive shaft. The demand for tolerance to damage is required for a drive shaft which is arranged in an exposed (unencapsulated) manner with respect to the environment and may, for example, be subjected to stone throw. This requirement exists, for example, for the drive shaft of the rear rotor of a helicopter.

A drive shaft with a nominal rotational speed below the critical rotational speed is called an "undercritical shaft". Such an undercritical shaft will be considered in the following.

In order to achieve a high bending resistance, the mass of the drive shaft could be increased. This would have a favorable effect with respect to the tolerance to damage. The result would be an approximation between the nominal rotational speed and the critical rotational speed. The critical rotational speed corresponds to a bending-critical rotational speed of the drive shaft, as described in D. Beitz, K.-H. Grote, Dubbel—"Taschenbuch für den Maschinenbau" ("Mechanical Engineering Manual") 19th, completely revised edition, Springer Publishers, 1997, Page B40, Section 4.1.5. This is undesirable. Nevertheless, while its bending resistance is high, the drive shaft should have a small mass, that is, be relatively thin, for reasons of a light construction. These are contrasting technical requirements. Under this aspect, such a drive shaft is constructed as a hollow shaft in order to minimize the mass.

In the case of this drive shaft, it is also not intended to lower the nominal rotational speed in order to improve the tolerance to damage by increasing the mass and in order to simultaneously operate as an undercritical shaft.

In numerous applications in machine and system construction, there is the demand for a light construction in order to nevertheless ensure a high resistance to bending and tolerance to damage in the case of an undercritical drive shaft.

In order to eliminate the disadvantage of a large mass, it is also known to produce the drive shaft of fiber composite material.

In a winding process, a filament yarn preimpregnated with resin is wound up while traversing the yarn between two spaced distance marks of a winding spindle. The term "traversing" originating from the textile industry relates to the guiding of a yarn, which is to be wound up, by means of a yarn guide in the axial direction along the winding body (winding spindle) between the two spaced distance marks. In this case, several layers of yarns are formed. Subsequently, the wound yarn layers are hardened. The resin and the hardener form the so-called matrix material.

The literature reference Dr. O. Schwarz, "Glasfaserverstärkte Kunststoffe" ("Glass-Fiber-Reinforced Plastic Materials") Vogel Publishers, Würzburg 1975, Pages 83–90, describes the production of tube-shaped components by winding technical fibers, such as glass fibers and/or carbon fibers. The term "fiber" is a filament fiber, that is, a yarn. Technical fibers are those materials which are not natural fibers, such as wool or cotton.

It is demonstrated that the required winding method is generally dependent on the geometry of the tube-shaped component to be wound, its desired construction characteristics and the mechanical loads to be expected later.

The selection of the process steps during the winding of a tube-shaped component will differ according to the usage purpose of the tube-shaped component. According to the above-mentioned technical literature of Dr. Schwarz, page 89, the winding of filaments or of rovings is in the foreground. By means of the winding process, it is possible to provide the tube with resistance to bending and torsion.

However, this type of a tube, which is produced by means of a winding process of a filament or of a roving, does not meet the requirements with respect to a drive shaft which is tolerant with respect to damage.

Also, the production of individual woven hoses, their arrangement inside one another, the impregnating with a resin and a hardener and the subsequent hardening are known for producing a drive shaft. It is considered to be problematic that a complete reproducibility of the quality characteristics cannot be ensured without high expenditures. The insertion of the woven hoses results in the risk that the fiber orientation may be undesirably changed and is not recognized. As a result, no satisfactory drive shaft is achieved which is tolerant to damage.

Generally, a prior art method of producing a drive shaft is illustrated in FIGS. 1A–1C. As shown in FIG. 1A, a first process step 10 includes winding of layer(s) of prepreg 1 on a winding shaft 4. As shown in FIG. 1B, in a second process step 20, following layer(s) of prepreg 2 are wound on winding shaft 4 by rotating the winding shaft 4 in a direction as shown. As shown in FIG. 1C, the third process step 30 shows the first layer(s) of prepreg 1 wound around the winding shaft 4 and the following layer(s) of prepreg 2 wound around first layer(s) 1, i.e., all layers of prepreg are wound.

German Patent Document 1923179 U relates to a tube-shaped shaft for the transmission of driving forces in a motor vehicle. The drive shaft of that document is made of a bending-resistant plastic material. In this case, reinforcing devices constructed as fibers or bands are arranged in a spiral-shaped manner in the shaft.

According to German Patent Document DE 1923179 U, it was known to a person skilled in the manufacturing of fiber composite materials that the reinforcing devices are impregnated with liquid plastic in a molding tool. As it cooled, the plastic material (epoxy or polyester resin) hardened and the reinforcing devices were integrated in the plastic material. The plastic material was used as a support for the reinforcing device. This document also teaches the insertion of woven material as a reinforcing device into the tube-shaped shaft. It uses no prepreg layers but woven-type dispersions in the tube wall (Page 3, Lines 22 to 24). The known solution has an insufficient damage tolerance stability which is not satisfactory for the helicopter construction.

German Patent Document DE 3822417 C2 relates to a method of producing a shaft for the transmission of torsional forces. The object of that document is the production of the shaft in a simple manner with respect to its manufacturing. The document teaches to produce the shaft by using the winding technique using fiber composite material. FIG. 3 of the reference shows a shaft which is produced from impregnated fiber mats or prepregs. In this case, the prepreg can be wound up spirally. This solution also does not yet have a satisfactory damage tolerance stability as required in helicopter construction.

The known prior art also has the disadvantage that the risk of wrinkling exists, for example, in the pressing mold (for example, vacuum bag). It is known to a person skilled with respect to fiber composite materials that the woven material layers undergo a setting (shrinkage) in the pressing mold which does not exclude a wrinkling. The wrinkling corresponds to a local deviation from the ideal fiber orientation in the woven material. This has a disadvantageous effect on the stiffness against torsion of the drive shaft.

BRIEF DESCRIPTION OF THE DRAWINGS

FIG. 2A is a sectional schematic view depicting a first process step of producing a drive shaft according to the present invention.

FIG. 2B is a sectional schematic view depicting a second process step of producing the drive shaft according to the present invention.

FIG. 2C is a sectional schematic view depicting a third process step of producing the drive shaft according to the present invention.

FIG. 2D is a sectional schematic view depicting a fourth process step of producing the drive shaft according to the present invention.

FIG. 2E is a sectional schematic view depicting a fifth process step of producing the drive shaft according to the present invention.

DETAILED DESCRIPTION OF THE DRAWINGS

Figure 1C:
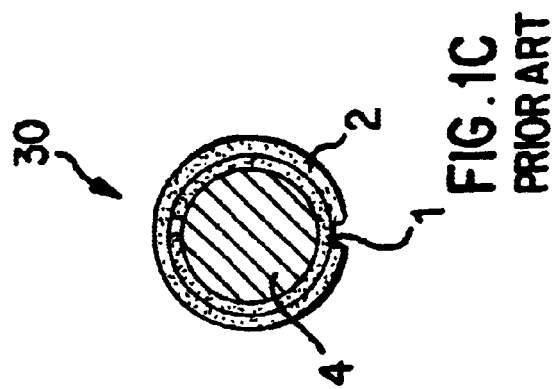
FIG. 1C is a sectional schematic view depicting a third process step of producing the drive shaft according to the prior art.
Figure 1B:
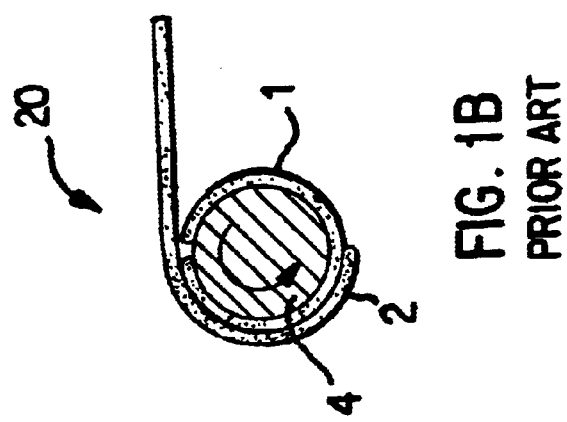
FIG. 1B is a sectional schematic view depicting a second process step of producing the drive shaft according to the prior art.
Figure 1A:
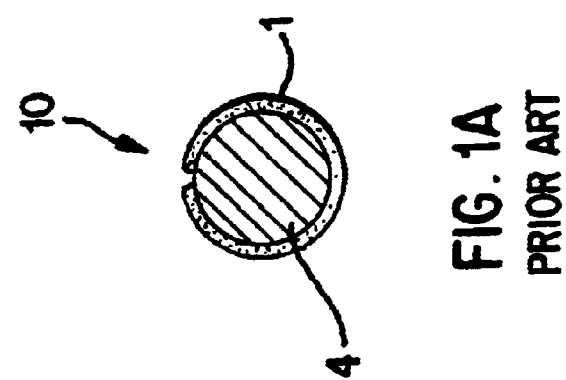
FIG. 1A is a sectional schematic view depicting a first process step of producing a drive shaft according to the prior art.

It is an object of the invention to improve a tube-shaped, torsion- and bending-resistant drive shaft, which is made of fiber composite material and is to be used as an undercritically operating shaft, such that a high tolerance to damage is achieved with respect to torsional stability and the manufacturing process nevertheless remains reasonable with respect to cost.

The drive shaft consists of a fiber composite material which consists at least of several, for example, spirally wound-up webs of prepreg. A prepreg is a woven web or layer which is preimpregnated with resin and hardener and is not yet completely hardened. The prepreg has a defined fiber orientation.

According to an embodiment, the prepreg web may consist of a 0°/90° prepreg layer. However, there is also the alternative that the prepreg web consists of a +/−45° prepreg layer or a multiaxial laying.

The method of producing a drive shaft of a fiber composite material, as shown in FIGS. 2A–2E, is achieved in that prepreg webs or layers wound up by the winding spindle are deaerated by the subsequent spiral-shaped winding-up of a prestressed thermoplastic woven band and are uniformly compressed, and after the unwinding of the thermoplastic woven band, additional prepreg webs can be wound up which are then also deaerated by means of a thermoplastic woven band to be wound up and are uniformly compressed. This thermoplastic woven band is also unwound again.

The multiple repetition of this process step during the manufacturing results in a clear increase of the damage tolerance stability.

The winding spindle 4 is advantageously uniformly heated during the winding at a temperature in the range of approximately 60° to 70°. As a result, it is achieved that, in the process step according to the invention during the treatment of the prepreg 1, 2 with the thermoplastic woven band 3, the prepreg is held in a ductile condition. During the deaerating and compressing of the prepreg layers by means of the thermoplastic woven band, the thermoplastic woven band is wound up with a prestress. The prestressing of the thermoplastic woven band is to be determined empirically. In this case, the prestress results only in an elastic form change of the thermoplastic woven band, so that, after the unwinding of the thermoplastic woven band, a restoring (restoring effect) to the original shape of the woven band is possible. The prestress is to be adjusted such that no fulling effect becomes visible in the prepreg layer in that waves of the prepreg are pushed ahead of the latter as a result of the thermoplastic woven band.

The dwell time of the wound-up thermoplastic woven band is to be determined empirically. The thermoplastic woven band can be unwound again as soon as a completed winding has been achieved.

By means of the thermoplastic woven band wound up under prestress, it is possible to press out superfluous resin and to suck off the excess of resin, in which case the remaining resin and the woven material are compressed further. It is assumed that this process step creates a clear increase of the damage tolerance stability. In this sense, very close-meshed prepreg layers are used which exhibit a very high burl frequency per surface unit in the woven material. In an applied sense, burls in this case are the points of support between the woven filaments.

The process can be further developed in that the prepreg is isotropic and precompacted. Furthermore, it is suggested, when rolling up another web of the prepreg, to offset its start on the circumference by 180° with respect to the end of the preceding web of the prepreg. As a result, borders and uneven mass distributions are avoided along the circumference.

The invention permits the production of a tube-shaped, torsion- and bending-resistant and simultaneously damage-tolerant drive shaft. It is therefore possible to produce a bending-resistant drive shaft which, also in the case of impact-caused damage, result in a sufficiently high stability with respect to resistance to torsion.

It was found that, as a result of the burl structure of the woven fabric laminate, the tolerance to damage can be further positively influenced. The manufacturing method is a wind-up process. It ensures a good concentricity of the shaft, and a relatively high mass flow rate is achieved. A simple turning lathe with a winding spindle is suitable for the winding up. The manufacturing process according to the invention therefore requires lower investments.

The invention will be further explained by means of the following example. This example comes from the aircraft field. The example is correspondingly not limited to the aircraft field.

For example, in the case of rotary-wing aircraft, particularly helicopters, at least one driving turbine supplies the torque to a main transmission, and from there, a drive shaft—the main rotor shaft—supplies the torque to the rotor, and, on the other hand, a second drive shaft—the rear rotor shaft—supplies the torque to the rear rotor. Because of dynamic movements of the rear extension arm during the flight, particularly the rear rotor shaft is subjected to numerous mechanical loads, particularly bending loads. The rear rotor shaft is a tube-shaped stiff torsion shaft which must also absorb bending. For example, in the case of individual helicopter types, it is arranged on the rear extension arm in an exposed manner; that is, it is not encapsulated. The rear rotor shaft operates as an undercritical shaft. The rear rotor shaft is produced of several shaft sections which are mutually connected by way of flanges.

The rear rotor connected with the rear rotor shaft is used for compensating the main rotor torque and for the controlling about the vertical axis of the rotor. High physical quality demands exist for the main rotor shaft and the rear rotor shaft. In particular, the rear rotor shaft should still have sufficient residual stability with respect to torsion in the event of impact-caused damage, and therefore should have a high tolerance to damage.

According to the invention, as shown in FIG. 2A, a prepreg 1 or an isotropic woven material laminate is rolled up in a process step 10 on a rotating winding spindle 4. This prepreg is a woven material surface which can be wound up as a web. The known 0°/90° prepreg layer and/or the +/−45° prepreg layer are used. However, before the winding-up, such a prepreg layer is precompacted (compressed) in a vacuum. As a result, the prepreg layer is improved in its quasi-isotropic condition. A deaerating and a first suctioning-off of the matrix is carried out thereby. This reduces the formation of shrinkage cavities and the risk of wrinkles. It also reduces the setting path of the prepreg layer and results in a stabilization of the fiber orientation. A prepreg layer prepared in such a manner is wound onto the preheated winding spindle. The width of the prepreg layer may correspond to the length of the winding spindle, but the width of the prepreg layer may also be smaller than the length of the winding spindle. In the latter case, the prepreg layer to be wound up should be guided in the axial direction along the winding spindle. After a few windings, the end of the prepreg layer is deposited over the start of the prepreg layer.

The wound-up prepreg webs result in so-called layers of prepreg. Several prepreg layers form a laying. With the winding-up of the prepreg webs, the fiber orientation of the woven material is consequently maintained.

In a further step 11, for example, after approximately 2 to 4 prepreg layings (corresponds to approximately 4 to 8 prepreg layers), as shown in FIG. 2B, a thermoplastic woven band 3 prestressed in a defined manner is wound on them. As a function of various influences, for example, the roller diameter, the temperature, and others, the prestressing of the thermoplastic woven band may be at approximately 50 N to 100 N. This should be determined empirically.

A fulling effect in the prepreg should be avoided. This thermoplastic woven band utilizes the restoring effect of thermoplastics during an elastic deformation. This results in another precompacting of the prepreg layer. In this case, the prepreg layers are deaerated and another suctioning-off of the matrix and a compression takes place.

The object of this process step is a further reduction of the setting path, a further reduction of the wrinkling risk and of the shrinkage cavity formation. Likewise, the fiber orientation in the prepreg layer is again stabilized.

Immediately after the complete winding-on or after a short dwell time (a few minutes), the thermoplastic woven band 3 is removed again by means of unwinding, as can also be seen in step 11 of FIG. 2B.

In a further process step 20, as can be seen in FIG. 2C, another prepreg web 2 is now wound up. The winding-up or rolling-around takes place such that the start of this prepreg layer is offset by 180° with respect to the end of the preceding prepreg layer. During the winding-up of the prepreg layer, its start will form a new layer after each complete rotation. The number of layers to be applied depends on the desired dimensioning of the future drive shaft.

Another step 21 of the deaerating and of the uniform compressing takes place by means of a prestressed thermoplastic woven band 3, as can be seen in FIG. 2D.

One of the two prepreg layers 1, 2 so far rolled-around, as shown by reference numeral 30 in FIG. 2E, may, for example, be a 0°/90° prepreg layer which is decisive for achieving a sufficient bending resistance. The other prepreg layer may be a +/−45° prepreg layer which produces the required torsion stiffness of the future shaft.

For the further increase of the bending resistance, in a further process step, the covered spindle can be wound by means of a carbon fiber uni-prepreg layer. Then a woven glass fiber prepreg layer would be wound onto the latter. This achieves a protection of the carbon fiber uni-prepreg layer. In addition, the damage identification is improved. The winding-up of a woven pull-off material (process material) is used for the further deaerating, the further suctioning-off of the matrix and the compressing.

Together with the thus wound-up prepregs, the winding spindle is inserted into a pressure shell made of silicone, this pressure shell radially enclosing the winding spindle. By means of this pressure shell made of silicone, a uniform pressure distribution is achieved along the completely covered winding spindle. As a result, the achieving of a uniform wall thickness of the drive shaft can be influenced, so that a high laminate quality and fewer unbalanced masses are created. The completely covered winding spindle with the pressure shell made of silicone is inserted into a vacuum shell and, as a result of the evacuation of the air from the vacuum shell, the elastic vacuum shell (deaerating knit) is form-lockingly placed against the pressure shell. As a result, a uniform pressure is built up with respect to the pressure shell which transmits this pressure to the completely covered winding spindle. There is another deaerating of the prepreg layers. The use of a pressure shell can optionally be eliminated.

The completely covered winding spindle situated in a vacuum shell is fed into a hardening furnace for the hardening of the prepreg layers. While maintaining a required temperature, after a dwell time in the furnace and the starting of the cooling process, the prepreg layers are hardened. During the stay of the winding spindle in the vacuum shell and in the hardening furnace, the contact pressure onto the prepreg layers is increased uniformly from the outside by means of the pressure shell as well as uniformly from the inside by means of the thermally expanding winding spindle.

The completely covered winding spindle is removed from the hardening furnace, is cooled and is removed from the vacuum shell and the pressure shell. Subsequently, the hardened tube is taken off the winding spindle. Then, the pull-off woven material is removed and the tube is cut to the desired length. The length, curvature, wall thickness and mass parameters are measured. If the desired parameters have been reached, the drive shaft produced from carbon fiber composite material is used for the further mounting.

The thus produced drive shaft on the basis of a fiber composite material represents a drive shaft which is tolerant with respect to damage. Thus, a bending-resistant shaft can be produced which, also in the event of impact-caused damage, results in a sufficient residual stability with respect to the resistance against torsion.

In contrast to the winding technique of filaments, the winding-up of an isotropic pre-compacted prepreg layer results in a finer burl structure which permits an improvement of the tolerance to damage, that is, an improved impact behavior. The close-meshed woven material of the prepreg ensures a relatively high fiber fraction and a high burl accumulation. The spiral layer construction in the case of the produced drive shaft additionally improves the impact behavior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of producing a tube-shaped torsion-proof and bending-resistant drive shaft consisting of a fiber composite material which consists at least of several wound-up webs of prepreg, the prepreg webs being wound on a withdrawable winding spindle and the tube-shaped drive shaft wound on layers of prepreg webs being heated and hardened, comprising:

deaerating and uniformly compressing the prepreg webs wound up by the winding spindle by subsequent spiral-shaped winding-up of a prestressed thermoplastic woven band, unwinding the thermoplastic woven band, winding up additional prepreg webs and deaerating and uniformly compressing the additional prepreg webs by subsequent spiral-shaped winding-up of the prestressed thermoplastic woven band and unwinding the thermoplastic woven band.

2. Method according to claim 1, wherein at least one of the prepreg webs is isotropic and precompacted.

3. Method according to claim 1, wherein at least one of the prepreg webs has a fiber orientation of $\pm 45°$.

4. Method according to claim 1, wherein at least one of the prepreg webs has a fiber orientation of $0°/90°$.

5. Method according to claim 1, wherein when an additional web of prepreg is wound up, a start position of the additional web at a circumference of the spindle is offset by $180°$ with respect to an end of a preceding prepreg web.

6. Method according to claim 1, wherein the thermoplastic woven band is wound up with a prestress.

7. Method according to claim 1, wherein the winding spindle is uniformly heated during winding-up of the webs of prepreg.

8. Method according to claim 7, wherein, the winding spindle is heated to a temperature of from approximately $60°$ C. to $70°$ C.

9. Method according to claim 1, wherein after the prepreg layers are wound, as an outer shell of the drive shaft, at least one carbon fiber uni-prepreg layer is arranged, followed by one glass fiber woven material prepreg layer, and finally by a woven pull-off material.

10. A method for producing a drive shaft comprising the steps of:

winding a prepreg web on a winding spindle;

winding a thermoplastic woven band around the wound prepreg web;

unwinding the thermoplastic woven band from around the wound prepreg web;

winding a second prepreg web on the winding spindle around the wound prepreg web;

winding the thermoplastic woven band around the second wound prepreg web; and unwinding the thermoplastic woven band from around the second wound prepreg web.

11. The method according to claim 10 wherein the prepreg web and the second prepreg web are comprised of a fiber composite material.

12. The method according to claim 10 wherein at least one of the prepreg webs is isotropic and precompacted.

13. The method according to claim 10 wherein at least one of the prepreg webs has a fiber orientation of $\pm 45°$.

14. The method according to claim 10 wherein at least one of the prepreg webs has a fiber orientation of $0°/90°$.

15. The method according to claim 10 wherein when an additional web of prepreg is wound up, a start position of the additional web at a circumference of the spindle is offset by $180°$ with respect to an end of a preceding prepreg web.

16. The method according to claim 10 wherein the winding spindle is uniformly heated during winding-up of the webs of prepreg.

17. The method according to claim 16 wherein the winding spindle is heated to a temperature of from approximately $60°$ C. to $70°$ C.

* * * * *